US010279627B2

(12) United States Patent
Raulerson, Jr. et al.

(10) Patent No.: US 10,279,627 B2
(45) Date of Patent: May 7, 2019

(54) NON-PNEUMATIC TIRE

(71) Applicants: James Marklee Raulerson, Jr., Holland, MO (US); Riley Rhodes, Steele, MO (US)

(72) Inventors: James Marklee Raulerson, Jr., Holland, MO (US); Riley Rhodes, Steele, MO (US)

(*) Notice: Subject to any disclaimer, the term of this patent is extended or adjusted under 35 U.S.C. 154(b) by 506 days.

(21) Appl. No.: 15/050,621

(22) Filed: Feb. 23, 2016

(65) Prior Publication Data
US 2017/0239994 A1 Aug. 24, 2017

(51) Int. Cl.
*B60C 7/00* (2006.01)
*B60C 7/08* (2006.01)
*B60C 7/10* (2006.01)
*B60C 7/14* (2006.01)

(52) U.S. Cl.
CPC .......... *B60C 7/08* (2013.01); *B60C 2007/107* (2013.01); *B60C 2007/146* (2013.01); *B60C 2200/08* (2013.01)

(58) Field of Classification Search
CPC .............. B60C 7/00; B60C 7/08; B60C 7/10
See application file for complete search history.

(56) References Cited

U.S. PATENT DOCUMENTS

| | | | |
|---|---|---|---|
| 1,422,996 A * | 7/1922 | Long | B60C 7/18 152/266 |
| 1,458,926 A * | 6/1923 | Burgos | B60C 7/16 152/298 |
| 5,226,690 A | 7/1993 | Clark et al. | |
| 5,265,659 A | 11/1993 | Pajtas et al. | |
| 5,810,452 A | 9/1998 | Hawthorne et al. | |
| 6,303,060 B1 | 10/2001 | Lobo et al. | |
| 6,616,374 B2 | 9/2003 | Starr | |
| 7,775,610 B2 | 8/2010 | Mettenbrink | |
| 7,950,428 B2 * | 5/2011 | Hanada | B60C 7/08 152/326 |
| 8,056,593 B2 | 11/2011 | Palinkas et al. | |
| 8,657,215 B1 | 2/2014 | Blum | |
| 2007/0131806 A1 | 6/2007 | Starr | |
| 2010/0084910 A1 | 4/2010 | Botes et al. | |
| 2011/0121090 A1 | 5/2011 | Price | |
| 2011/0278911 A1 * | 11/2011 | Funaki | B60B 9/00 301/62 |
| 2012/0241531 A1 | 9/2012 | Werner | |

(Continued)

FOREIGN PATENT DOCUMENTS

WO WO 2015/077438 * 5/2015

OTHER PUBLICATIONS

BB's Metal Works, The Pivot Tire Solution, http://www.steeltread.com/, Aug. 28, 2014.

(Continued)

*Primary Examiner* — Justin R Fischer
(74) *Attorney, Agent, or Firm* — Stinson Leonard Street LLP

(57) ABSTRACT

A non-pneumatic tire having at least two tire sections that are operable to be coupled together. Each tire section includes an inner wall, an outer wall, and a plurality of radial supports that extend from the inner wall to the outer wall such that there is no interior volume enclosed by any combination of the inner wall, the outer wall, and the plurality of radial supports.

19 Claims, 8 Drawing Sheets

(56) References Cited

U.S. PATENT DOCUMENTS

| | | | |
|---|---|---|---|
| 2013/0167990 A1* | 7/2013 | Bae | B60B 1/00 |
| | | | 152/1 |
| 2013/0192734 A1 | 8/2013 | Seljan | |
| 2014/0062168 A1 | 3/2014 | Martin et al. | |

OTHER PUBLICATIONS

Candeefarms, No Flat Pivot Tires, http://www.candeefarms.com/no-flat-pivot-tires.html, Aug. 28, 2014.
Farmprogress, Rethinking Irrigation Wheels, http://farmprogress.com/story-rethinking-irrigation-wheels-13-102303, Aug. 28, 2014.
Farmshow, Replacement Wheel for Center Pivots, http://www.farmshow.com/a_article.php?aid=21243, Aug. 28, 2014.

\* cited by examiner

NON-PNEUMATIC TIRE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed toward a non-pneumatic tire that is configured to be mounted on a wheel, including, but not limited to, a wheel for a center-pivot irrigation system.

2. Description of Related Art

Tires are typically made from rubber and must be inflated in order to operate properly. Rubber tires are subject to wear and tear and can suffer flats, which in turn requires that the flat be repaired or the tire be replaced entirely.

In a typical center-pivot irrigation system, water from a centrally located source, such as a well, is directed along a boom pipe to a field. The boom pivots around a center point on spaced apart towers, which support the boom. The towers are usually supported by wheels with large rubber tires. The weight of the irrigation system can cause the tires to sink and get stuck as they move through a muddy field, which can slow or temporarily halt irrigation operations.

U.S. Pat. App. Pub. No. 2013/0192734 to Seljan discloses a non-pneumatic, two-piece tire formed from a moldable material. The two-piece tire includes concentric inner and outer cylindrical surfaces and sidewalls that together enclose an interior volume. Because the tire is non-pneumatic and encloses an interior volume, water, mud and other debris can fill the tire by entering the enclosed interior volume through openings at the point of contact between the tire and wheel or at the points of contact between the two pieces of the tire.

BRIEF SUMMARY OF THE INVENTION

This disclosure is directed to a non-pneumatic tire that is configured to be mounted on a wheel, including, but not limited to, a wheel for a center-pivot irrigation system. The non-pneumatic tire includes at least two tire sections that are operable to be coupled together. Each tire section includes an inner wall, an outer wall, and a plurality of radial supports that extend from the inner wall to the outer wall such that there is no interior volume enclosed by any combination of the inner wall, the outer wall, and the plurality of radial supports.

In one embodiment, at least one of the tire sections includes a plurality of traction cleats coupled with and circumferentially spaced on the outer wall. Preferably, the traction cleats are integrally formed with the outer wall. At least one of the traction cleats preferably includes first and second side surfaces that are coupled with and extend radially outward from the outer wall and a top surface that is coupled with and extends between the first and second side surfaces. An angle X, which is preferably between approximately 125 to 155 degrees, is formed between the outer wall and at least one of the first and second side surfaces. Preferably, the plurality of traction cleats includes first and second adjacent traction cleats that are spaced a distance apart such that the intersection of the first side surface and the top surface of the first traction cleat is operable to be supported by a ground surface simultaneously with the intersection of the second side surface and the top surface of the second traction cleat.

At least one of the tire sections may include an inner arcuate support coupled to the inner wall and an outer arcuate support coupled to the outer wall. The plurality of radial supports may include a first radial support that is coupled with and extends between the inner arcuate support and the outer arcuate support, and a second radial support that is coupled with and extends between the inner wall and the outer wall. The first radial support is generally perpendicular to the second radial support. Preferably, the plurality of radial supports includes a third radial support that is coupled with and extends between the inner wall and the outer wall. The third radial support is generally parallel with the second radial support, and the second and third radial supports are positioned on opposite sides of the first radial support. More preferably, there are three outer arcuate supports. A first outer arcuate support generally aligned with the inner arcuate support, a second outer arcuate support that is spaced axially from the first outer arcuate support, and a third outer arcuate support that is spaced axially from the first outer arcuate support on an opposite side as the second outer arcuate support. Preferably, one of the outer arcuate supports includes a protrusion that is received by at least a portion of a traction cleat cavity.

Preferably, each of the tire sections includes first and second end plates each coupled with and extending between the inner wall and the outer wall. Preferably, the first end plate of the first tire section is joined to the first end plate of the second tire section with a plurality of fasteners each extending through aligned apertures in the first end plate of the first tire section and the first end plate of the second tire section. The second end plates of the tire sections are preferably joined in a similar manner.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
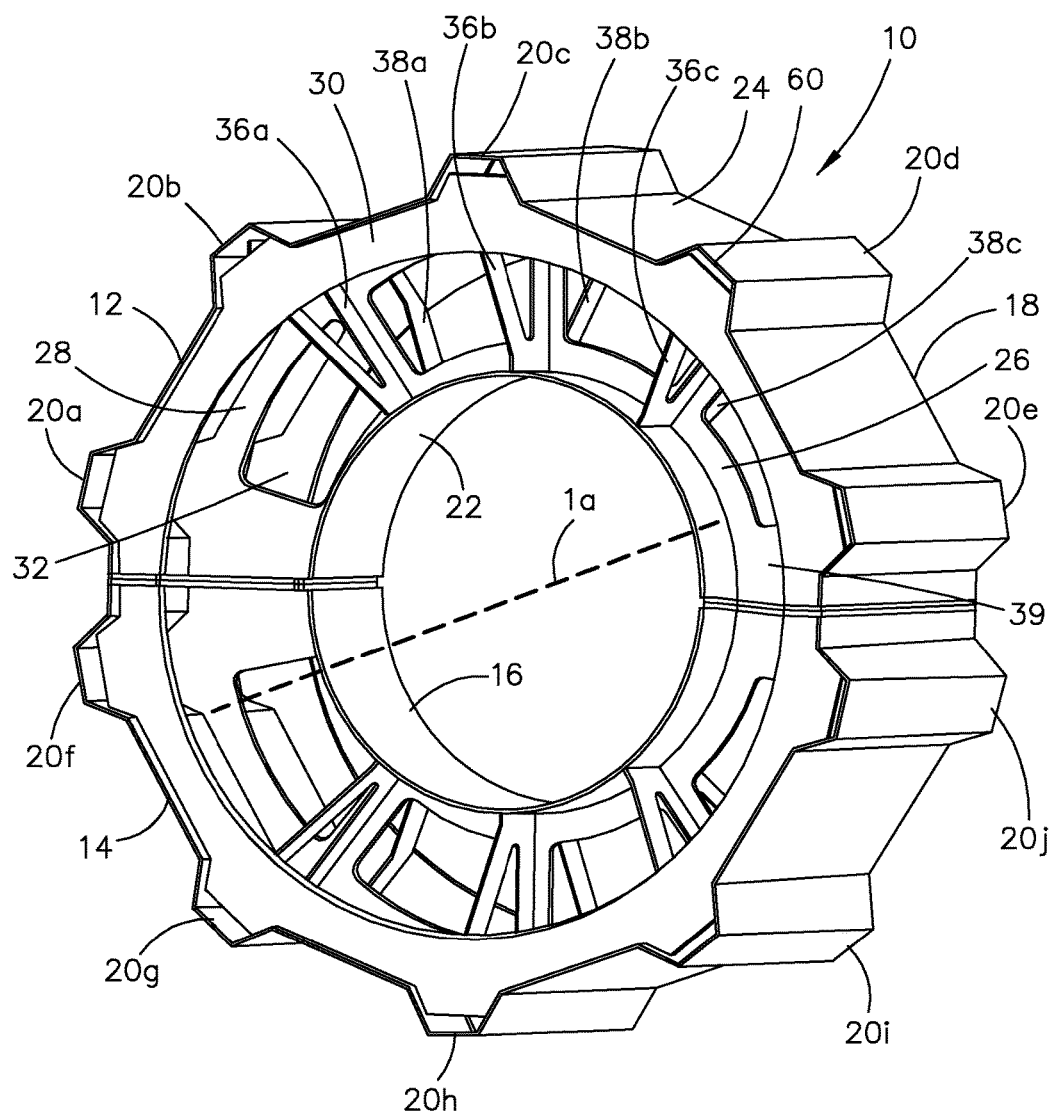
FIG. 1 is a perspective view of an exemplary embodiment of a non-pneumatic tire.

One exemplary embodiment of a non-pneumatic tire is shown in FIG. 1 and designated with the numeral 10.

Figure 5:
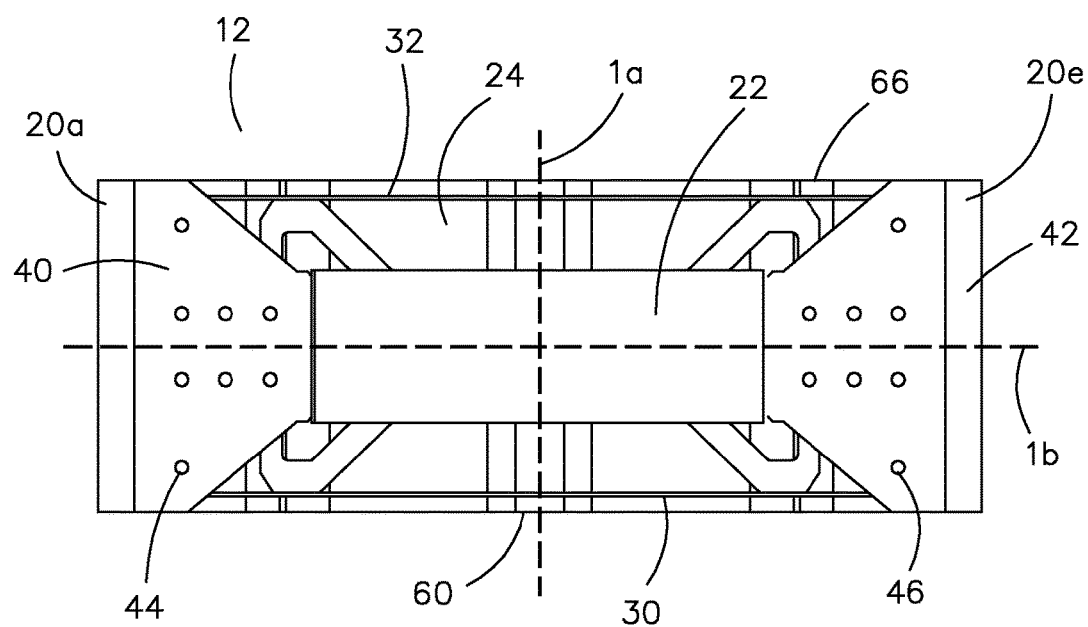
FIG. 5 is a top view of the first section shown in FIG. 2.
Figure 6:
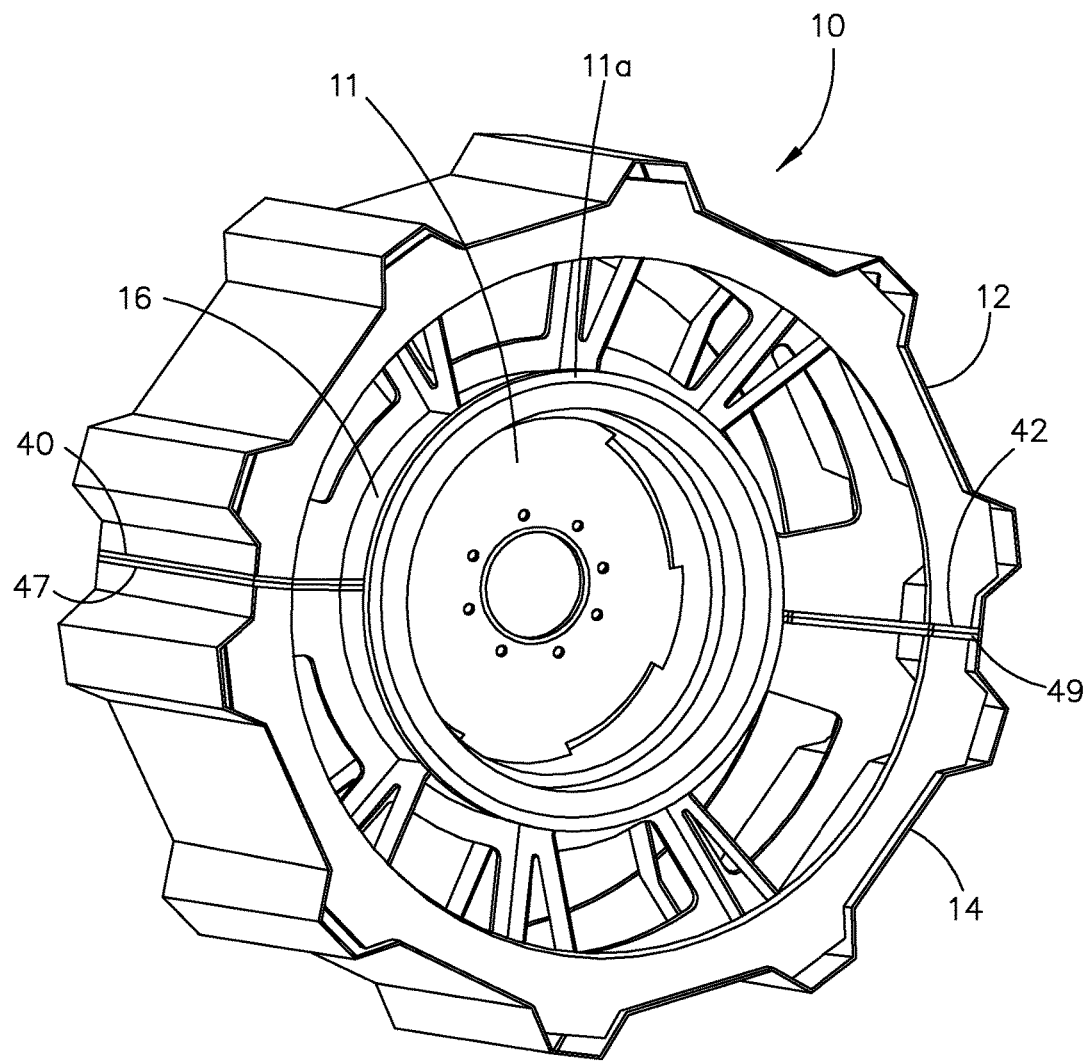
FIG. 6 is a perspective view of the non-pneumatic tire shown in FIG. 1 mounted on a wheel.

Non-pneumatic tire 10 is configured to be mounted on a wheel, such as wheel 11 shown in FIG. 6. Non-pneumatic tire 10 and wheel 11 may be used with any suitable device, including a center-pivot irrigation system. Non-pneumatic tire 10 may serve as a replacement for other tires, including conventional inflatable tires designed for use with standard or existing wheels. Non-pneumatic tire 10 is generally cylindrical and is relatively symmetrical about both its central axis 1a and a plane 1b (FIG. 5) that is perpendicular to central axis 1a and aligned with an axial center of the tire 10. Non-pneumatic tire 10 includes an arcuate first tire section 12 and an arcuate second tire section 14 that are joined to define a cylindrical inner wall 16 and a cylindrical outer wall 18 that includes a plurality of traction cleats 20a-j extending radially outward from the remainder of the outer wall 18. Although non-pneumatic tire 10 is shown with two tire sections 12 and 14, it is within the scope of the invention for the tire to include three or more tire sections.

Figure 2:
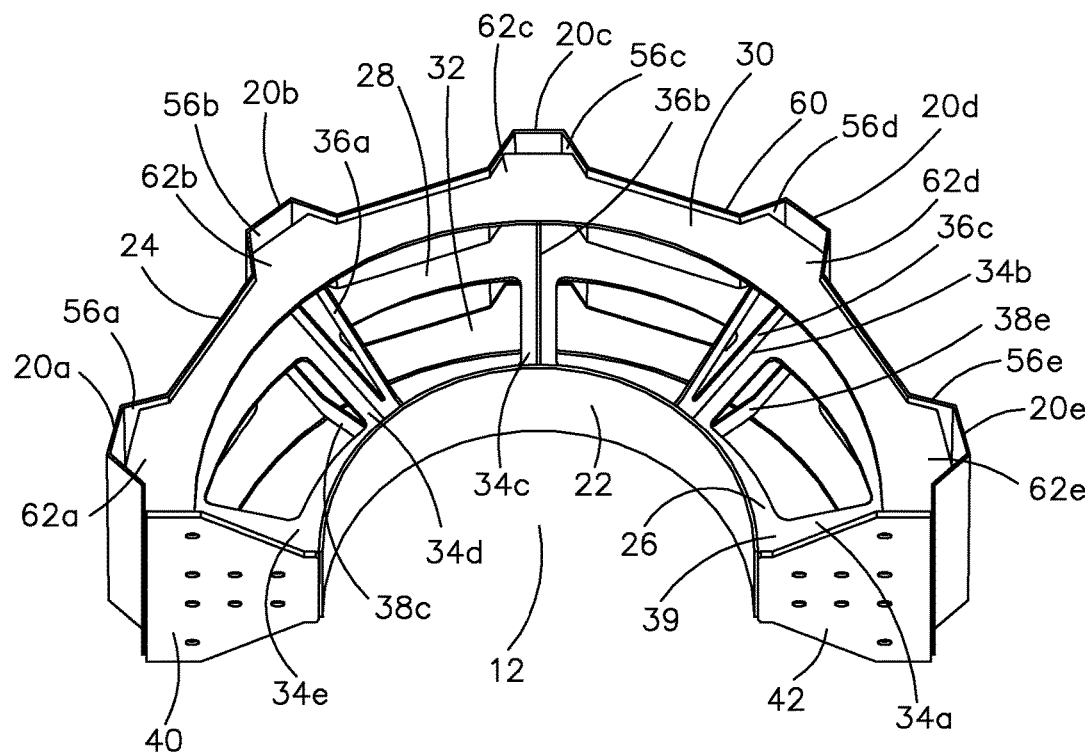
FIG. 2 is a perspective view of a first section of the non-pneumatic tire shown in FIG. 1.
Figure 3:
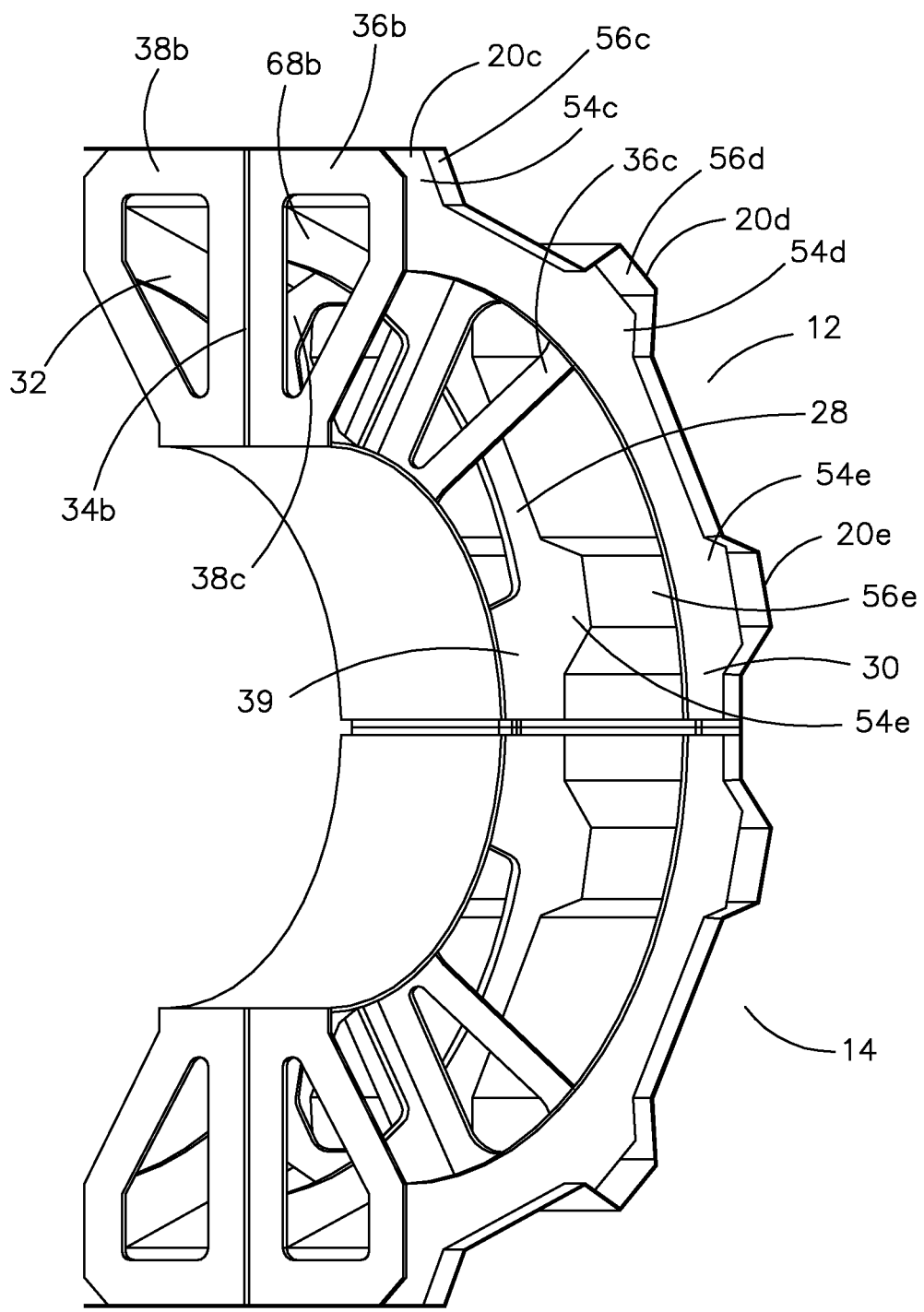
FIG. 3 is a perspective sectional view as viewed along the dashed line 3-3 shown in FIG. 7.
Figure 4:
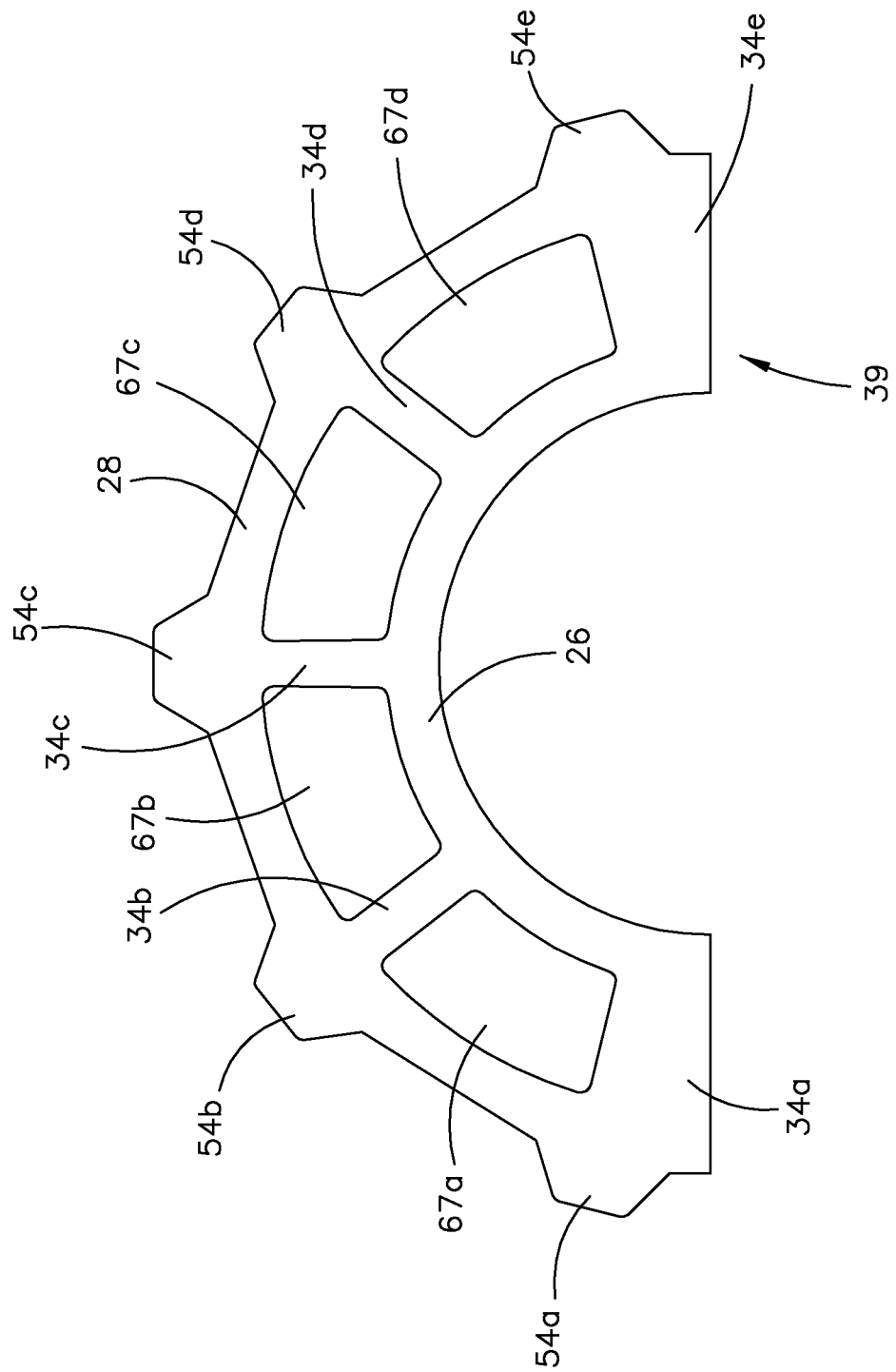
FIG. 4 is a side view of a support plate of the first section shown in FIG. 2.

First tire section 12 and second tire section 14 are substantially similar to each other. Accordingly, only first tire section 12 is described in detail herein. Referring to FIGS. 1-4, first tire section 12 includes arcuate inner wall section 22, arcuate outer wall section 24 with traction cleats 20a-e, inner arcuate support 26, first outer arcuate support 28, second outer arcuate support 30, third outer arcuate support 32, first radial supports 34a-e (FIG. 4), second radial supports 36a-c, and third radial supports 38a-c. As shown in FIG. 4, inner arcuate support 26, first outer arcuate support 28, and first radial supports 34a-e form an integral support plate 39 that is generally positioned within the plane 11b shown in FIG. 5. Referring to FIGS. 2 and 5, inner wall 22 and outer wall 24 each have uniform widths from one end to the other end of tire section 12, and outer wall section 24 is wider than inner wall section 22.

Figure 7:
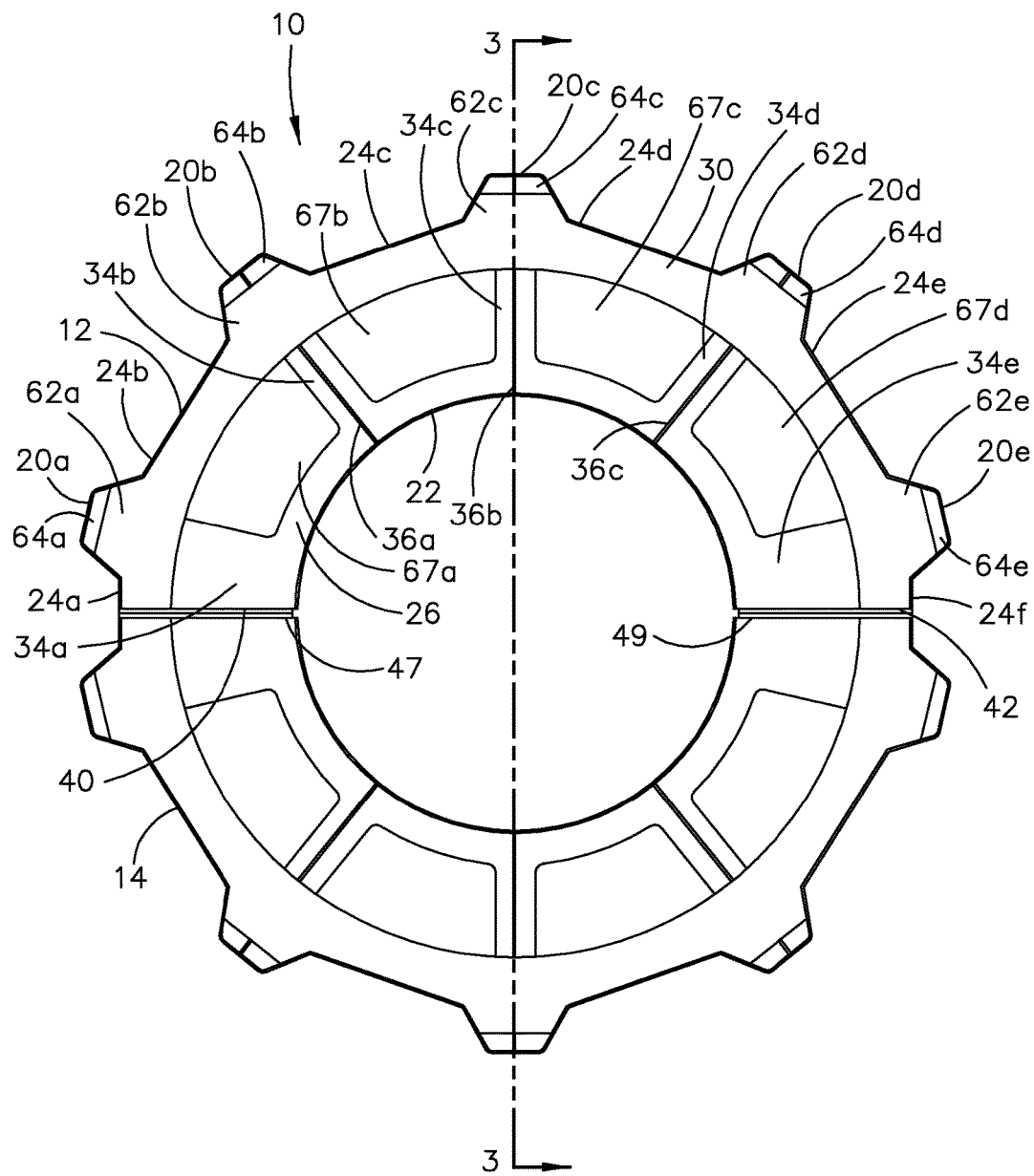
FIG. 7 is a side view of the non-pneumatic tire shown in FIG. 1.

Referring to FIG. 2, first tire section 12 includes a first end plate 40 and a second end plate 42 that are each coupled with and extend between inner wall section 22 and outer wall section 24. First and second end plates 40, 42 are substantially similar to each other and are located on opposite ends of tire section 12 with respect to one another. Referring to FIG. 5, end plates 40 and 42 each include a portion that is approximately as wide as outer wall section 24 and another portion that increases in width from inner wall section 22 toward outer wall section 24. End plates 40 and 42 include respective aperture sets 44 and 46. As shown in FIG. 7, when first tire section 12 and second tire section 14 are joined together, first end plate 40 abuts a first end plate 47 of second tire section 14, and second end plate 42 abuts a second end plate 49 of second tire section 14. First end plate 47 has an aperture set (not shown) that aligns with the aperture set 44 of first end plate 40, and a plurality of fasteners (not shown) are received by the aligned apertures to join the end plates 40 and 47. Likewise, second end plate 49 has an aperture set (not shown) that aligns with the aperture set 46 of second end plate 42, and a plurality of fasteners (not shown) are received by the aligned apertures to join the end plates 42 and 49. When first and second tire sections 12 and 14 are joined as shown in FIG. 1, their respective inner wall sections 22 form inner wall 16, and their respective outer wall sections 24 form outer wall 18. Because outer wall section 24 is wider than inner wall section 22, outer wall 18 is in turn wider than inner wall 16.

As shown in FIG. 7, outer wall section 24 includes traction cleats 20a-e that are coupled with and extend radially outward from an outer wall surface formed from discrete sections 24a-f positioned between adjacent traction cleats 20a-e. Traction cleats 20a-e are formed integrally with outer wall surface 24a-f. It is however within the scope of the invention for outer wall surface 24a-f to be continuous and for the traction cleats 20a-e to be separate components that are joined to outer wall surface 24a-f. Traction cleats 20a-e are circumferentially spaced around outer wall section 24 such that adjacent traction cleats 20a-e are positioned equidistant from each other. Traction cleats 20a-e generally have substantially the same size and shape. Referring to FIG. 1, traction cleats 20a-e each extend axially in the same direction as central axis 1a along the entire width of outer wall section 24.

Figure 8:
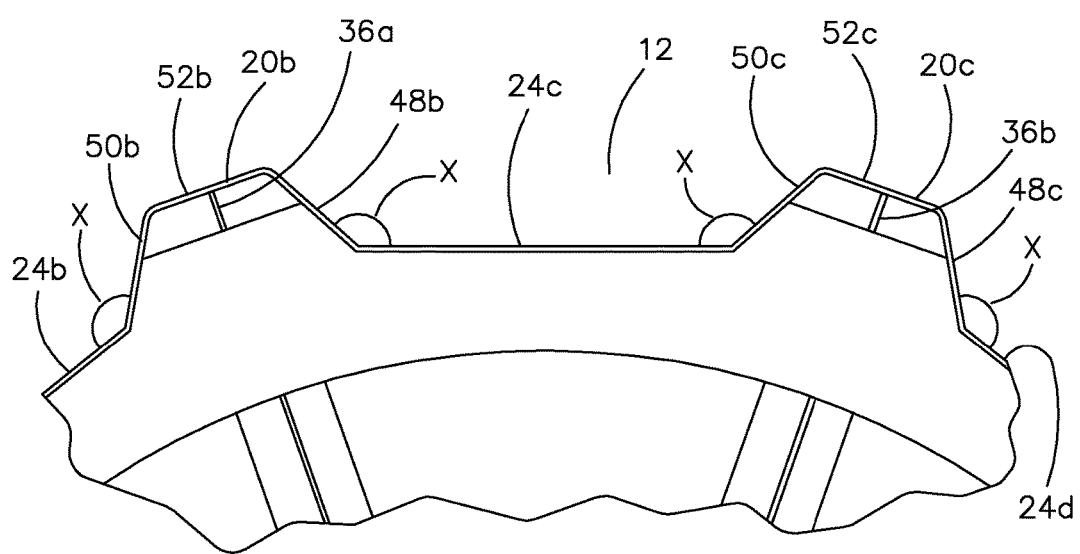
FIG. 8 is a side view of adjacent traction cleats of the non-pneumatic tire shown in FIG. 1.

Referring to FIG. 8, traction cleats 20b-c are representative of any two consecutive traction cleats 20 on first tire section 12. Accordingly, traction cleats 20a, 20d, and 20e are not described in detail herein. Traction cleats 20b-c include respective first side surfaces 48b-c, respective second side surfaces 50b-c, and respective top surfaces 52b-c. The portion of outer wall surface 24c that extends between traction cleats 20b-c is generally planar. First side surfaces 48b-c, second side surfaces 50b-c and top surfaces 52b-c are also generally planar. First side surfaces 48b-c and second side surfaces 50b-c are each coupled with and extend radially outward from one of outer wall surfaces 24b-d. Top surfaces 52b-c are each coupled with and extend between respective first and second side surfaces 48b-c and 50b-c.

An angle X is formed between each of the first and second side surfaces 48b-c and 50b-c and one of outer wall surfaces 24b-d. Preferably, the angle X is between approximately 125 degrees and 155 degrees. In one preferred embodiment, the angle X is approximately 139 degrees. Although the angles between each of the first and second side surfaces 48b-c and 50b-c and outer wall surfaces 24b-d are all shown as angle X in the drawings, it is within the scope of the invention for these various angles to have different values such that they are non-uniform. Traction cleats 20b-c are spaced apart a distance such that the intersection of the first side surface 48b and the top surface 52b of traction cleat 20b is operable to be supported by a ground surface simultaneously with the intersection of the second side surface 50c and the top surface 52c of traction cleat 20c. It is believed that this configuration, along with having the angle X between the first and second side surfaces 48b-c and 50b-c and the outer wall surfaces 24b-d, helps to concentrate dirt or mud in between traction cleats 20b-c to provide more ground support for tire 10 and prevent it from sinking. When traction cleats 20b-c are each supported by a ground surface, side surface 48b is angled with respect to a generally horizontal ground surface such that side surface 48b pushes dirt or mud both downward and at least partially toward side surface 50c. Likewise, side surface 50c is angled with respect to a generally horizontal ground surface such that side surface 50c pushes dirt or mud both downward and at least partially toward side surface 48b. The dirt or mud displaced by side surfaces 48b and 50c concentrates beneath the outer wall surface 24c between traction cleats 20b-c to provide a more concentrated ground surface capable of supporting the portion of tire 10, i.e., outer wall surface 24c, that is in contact with and is generally horizontal to the ground surface.

Referring to FIG. 2, first outer arcuate support 28, second outer arcuate support 30, and third outer arcuate support 32 are each generally planar and extend along an arc from first end plate 40 to second end plate 42 adjacent outer wall section 24. First outer arcuate support 28, second outer arcuate support 30, and third outer arcuate support 32 are each coupled to outer wall section 24, preferably by welding. Each outer arcuate support 28, 30, and 32 extends from outer wall section 24 radially inward toward inner wall section 22 and is generally perpendicular to first and second end plates 40 and 42.

First outer arcuate support 28 generally occupies the plane 1b extending through a center of non-pneumatic tire 10, as shown in FIG. 5. Referring to FIG. 4, first outer arcuate support 28 includes a plurality of cleat-shaped protrusions 54a-e that are each received by a respective one of traction cleat cavities 56a-e (FIG. 2). Traction cleat cavities 56a-e are substantially similar to each other in both size and shape. Each of cleat-shaped protrusions 54a-e substantially entirely fills its corresponding traction cleat cavity 56a-e, as best shown in FIG. 3 by protrusion 54e and cavity 56e. The traction cleat cavities 56a-e are formed by traction cleats 20a-e, respectively, and protrusions 54a-e are coupled to traction cleats 20a-e, respectively, preferably by welding. This configuration results in continuous contact between first outer arcuate support 28 and outer wall section 24 from first end plate 40 to second end plate 42, which adds strength and rigidity to outer wall section 24.

Referring to FIGS. 1, 2 and 5, second outer arcuate support 30 is spaced axially from first outer arcuate support 28 near a first outermost edge 60 of first tire section 12. Second outer arcuate support 30 is generally parallel to first outer arcuate support 28. Referring to FIGS. 2 and 7, second outer arcuate support 30 includes cleat-shaped protrusions 62a-e that are each received by a portion of one of respective traction cleat cavities 56a-e. As shown in FIG. 7, each cleat-shaped protrusion 62a-e preferably does not entirely fill its corresponding traction cleat cavity 56a-e (FIG. 2) such that a gap 64a-e extends between each respective traction cleat 20a-e and a radial outer surface of each respective protrusion 62a-e. Protrusions 62a-e are coupled to traction cleats 20a-e, respectively, preferably by welding. This configuration results in significant contact between second outer arcuate support 30 and outer wall section 24 from first end plate 40 to second end plate 42, which adds strength and rigidity to outer wall section 24. At the same time, this configuration prevents the storage of water, mud, soil, or other debris in the area between first outer arcuate support 28, second outer arcuate support 30, and outer wall section 24; gaps 64a-e allow for water, mud, soil, or other debris to drain or escape from this area.

Third outer arcuate support 32, as shown in FIG. 2, is spaced axially from first outer arcuate support 28 on the opposite side as second outer arcuate support 30. Third outer arcuate support 32 is generally parallel to first outer arcuate support 22. As shown in FIG. 5, third outer arcuate support 32 is positioned near a second outermost edge 66 of first tire section 12. Third outer arcuate support 32 is otherwise substantially similar to, and performs substantially the same functions as, second outer arcuate support 30, and as such is not described in more detail herein.

Referring to FIG. 7, inner arcuate support 26 is generally planar and extends along an arc from first end plate 40 to second end plate 42 adjacent inner wall section 22. Inner arcuate support 26 is coupled to inner wall section 22, preferably by welding. Inner arcuate support 26 extends from inner wall section 22 radially outward toward outer wall section 24 and is generally perpendicular to first and second end plates 40 and 42. Referring to FIG. 4, inner arcuate support 26 is generally parallel with and lies within the same plane 1b (FIG. 5) as first outer arcuate support 28. Inner arcuate support 26 adds strength and rigidity to inner wall section 22.

Each of the first radial supports 34a-e, second radial supports 36a-c, and third radial supports 38a-c extends from inner wall section 22 to outer wall section 24, or from inner wall 16 to outer wall 18, as shown in FIGS. 1 and 2. There is no interior volume enclosed by any combination of the inner wall 16, the outer wall 18, and the plurality of radial supports 34a-e, 36a-c, and 38a-c. Radial supports 34a-e, 36a-c, and 38a-c add strength and rigidity to first tire section 12.

Referring to FIGS. 4 and 7, first radial supports 34a-e are generally planar braces that each radially extend from inner wall section 22 to outer wall section 24 and from inner arcuate support 26 to first outer arcuate support 28. It will be appreciated that inner arcuate support 26, first outer arcuate support 28, and first radial supports 34a-e are formed integrally as one unitary, generally planar support plate 39 that is generally perpendicular to first and second end plates 40 and 42. It is, however, within the scope of the invention for the first radial supports 34a-e to be separate pieces that are joined to the inner arcuate support 26 and first outer arcuate support 28 by, for example, being welded together. Looking to FIG. 4, first radial supports 34a-e are generally equally spaced apart from one another in a circumferential direction to form openings 67a-d positioned between adjacent first radial supports 34a-e. Looking back to FIG. 7, first radial supports 34a and 34e are coupled to respective end plates 40 and 42, preferably by welding.

Second radial supports 36a-c, shown in FIG. 1, each radially extend between and are coupled to inner wall section 22 and outer wall section 24, preferably by welding. Second radial supports 36a-c are generally perpendicular to support plate 39 (FIG. 4) and second and third outer arcuate supports 30 and 32. Referring to FIG. 7, second radial supports 36a-b are spaced the same distance as second radial supports 36b-c. Second radial supports 36a-c are generally aligned with the respective centers of first radial supports 34b-d and traction cleats 20b-d.

Second radial supports 36a-c are substantially similar to each other. Accordingly, only second radial support 36b is described in detail herein with reference to FIG. 3. Second radial support 36b is a generally planar, polygonal ring with nonsymmetrical sides. Sides of second radial support 36b are coupled, preferably by welding, to traction cleat 20c, inner wall section 22, inner arcuate support 26, first outer arcuate support 28, second outer arcuate support 30, and first radial support 34b. Opening 68b is formed at the center of second radial support 36b. Second radial supports 36a and 36c are likewise coupled to, preferably by welding, respective traction cleats 20b and 20d, inner wall section 22, inner arcuate support 26, first outer arcuate support 28, second outer arcuate support 30, and respective first radial supports 34a and 34c.

Referring to FIGS. 1-3, third radial supports 38a-c are substantially similar to second radial supports 36a-c except that third radial supports 38a-c are positioned on the opposite side of support plate 39 as second radial supports 36a-c. Thus, as shown in FIG. 3 with respect to third radial support 38b, third radial supports 38a-c are essentially the mirror image of second radial supports 36a-c. Third radial supports 38a-c are parallel to, and generally occupy the same plane as, respective second radial supports 36a-c. Third radial supports 38a-c are likewise coupled to, preferably by welding, respective traction cleats 20b-d, inner wall section 22, inner arcuate support 26, first outer arcuate support 28, third outer arcuate support 32, and respective first radial supports 34a-c.

As best shown in FIGS. 2 and 3, no interior volume is enclosed by any combination of inner wall section 22 (or inner wall 16), outer wall section 24 (or outer wall 18), inner arcuate support 26, first outer arcuate support 28, second outer arcuate support 30, third outer arcuate support 32, first radial supports 34a-e, second radial supports 36a-c, third radial supports 38a-c, and end walls 40 and 42. Because no interior volume is enclosed by any portion of non-pneumatic tire 10, the tire 10 has an open and accessible interior construction making it easier to clean out than other tires. Further, non-pneumatic tire 10 will not fill with water, dirt, mud, or other debris. If any dirt, mud, or other debris is stuck to tire 10, it may be washed away or cleaned off in a relatively easy manner. Moreover, the non-pneumatic tire 10 is relatively lightweight due to its open design.

Non-pneumatic tire 10 does not suffer flats as it does not rely on air pressure to operate. Non-pneumatic tire 10 is also more durable and is less prone to wear and tear than inflatable tires. Non-pneumatic tire 10 can be of any suitable width and height that are appropriate for a given purpose and for attachment to a given wheel. In various exemplary embodiments, non-pneumatic tire 10 is made from a sufficiently strong and rigid moldable material such as plastic, metal, or combinations thereof. In one exemplary embodiment, non-pneumatic tire 10 is constructed from steel.

In use and as shown in FIG. 6, non-pneumatic tire 10 is mounted on a wheel 11 by placing the first and second tire sections 12 and 14 around the wheel such that first end plates 40 and 47 abut and second end plates 42 and 49 abut. Fasteners (not shown) are positioned through the aligned apertures in the end plates to join the first and second tire sections 12 and 14 together around wheel 11 such that inner wall 16 of tire 10 abuts and clamps wheel 11. Preferably, the diameter of inner wall 16 is slightly less than the diameter of the surface of wheel 11 in contact with inner wall 16 so that first and second tire sections 12 and 14 tightly clamp wheel 11, which in turn prevents or reduces slippage of tire 10 around wheel 11. In other words, tire 10 preferably does not rotate around wheel 11 when clamped to wheel 11. The width of inner wall 16 is preferably such that it fits between opposing flanges of wheel 11, one of which is identified as 11a in FIG. 6. The flanges 11a preferably extend radially outward from the surface of wheel 11 that abuts inner wall 16 so that the flanges 11a prevent the tire 10 from moving axially with respect to wheel 11 in a direction aligned with axis 1a (FIG. 1).

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A non-pneumatic tire comprising:
   at least first and second tire sections that are operable to be coupled together, wherein each of the tire sections comprises an inner wall, an outer wall, and a plurality of radial supports that extend from the inner wall to the outer wall such that there is no interior volume enclosed by any combination of the inner wall, the outer wall, and the plurality of radial supports, wherein the outer wall of at least one of the tire sections further comprises a plurality of traction cleats extending radially outward from an outer wall surface, wherein each of the traction cleats is coupled with the outer wall surface, and wherein the traction cleats are circumferentially spaced from each other around the outer wall surface.

2. The non-pneumatic tire of claim 1, wherein the traction cleats are integrally formed with the outer wall surface.

3. The non-pneumatic tire of claim 1, wherein at least one of the traction cleats comprises first and second side surfaces that are coupled with and extend radially outward from the outer wall surface and a top surface that is coupled with and extends between the first and second side surfaces, wherein an angle X is formed between the outer wall surface and at least one of the first and second side surfaces, and wherein the angle X is between approximately 125 degrees to 155 degrees.

4. The non-pneumatic tire of claim 3, wherein the angle X is approximately 139 degrees.

5. The non-pneumatic tire of claim 3, wherein the plurality of traction cleats includes first and second adjacent traction cleats that are spaced apart a distance such that the intersection of the first side surface and the top surface of the first traction cleat is operable to be supported by a ground surface simultaneously with the intersection of the second side surface and the top surface of the second traction cleat.

6. The non-pneumatic tire of claim 1, wherein at least one of the tire sections further comprises an inner arcuate support coupled to the inner wall and an outer arcuate support coupled to the outer wall, wherein the plurality of radial supports comprises a first radial support that is coupled with and extends between the inner arcuate support and the outer arcuate support, and a second radial support that is coupled with and extends between the inner wall and the outer wall, wherein the first radial support is generally perpendicular to the second radial support.

7. The non-pneumatic tire of claim 6, wherein the plurality of radial supports comprises a third radial support that is coupled with and extends between the inner wall and the outer wall, wherein the third radial support is generally parallel with the second radial support, and wherein the second and third radial supports are positioned on opposite sides of the first radial support.

8. The non-pneumatic tire of claim 7, wherein the outer arcuate support comprises a first outer arcuate support, wherein at least one of the tire sections further comprises a second outer arcuate support that is spaced axially from the first outer arcuate support and a third outer arcuate support that is spaced axially from the first outer arcuate support on an opposite side as the second outer arcuate support.

9. The non-pneumatic tire of claim 1, further comprising a wheel, wherein the first and second tire sections are joined together around the wheel such that the inner wall of each of the first and second tire sections abuts and clamps the wheel.

10. A non-pneumatic tire comprising:
    at least first and second tire sections that are operable to be coupled together, wherein each of the tire sections comprises an inner wall, an outer wall, and a plurality of radial supports that extend from the inner wall to the outer wall such that there is no interior volume enclosed by any combination of the inner wall, the outer wall, and the plurality of radial supports, wherein the radial supports comprise a first radial support and a second radial support that are generally perpendicular to each other.

11. A non-pneumatic tire comprising:
at least first and second tire sections that are operable to be coupled together, wherein each of the tire sections comprises an inner wall, an outer wall, and a plurality of radial supports that extend from the inner wall to the outer wall such that there is no interior volume enclosed by any combination of the inner wall, the outer wall, and the plurality of radial supports, wherein at least one of the tire sections further comprises at least one arcuate support that is coupled to at least one of the inner wall and the outer wall.

12. The non-pneumatic tire of claim 11, wherein the arcuate support comprises at least one protrusion that is received by at least a portion of a traction cleat cavity.

13. The non-pneumatic tire of claim 11, wherein the arcuate support is formed integrally with at least one of the radial supports.

14. A non-pneumatic tire comprising:
at least first and second tire sections that are operable to be coupled together, wherein each of the tire sections comprises an inner wall, an outer wall, and a plurality of radial supports that extend from the inner wall to the outer wall such that there is no interior volume enclosed by any combination of the inner wall, the outer wall, and the plurality of radial supports, wherein each of the tire sections further comprises first and second end plates each coupled with and extending between the inner wall and the outer wall.

15. The non-pneumatic tire of claim 9, wherein the first end plate of the first tire section is joined to the first end plate of the second tire section with a plurality of fasteners each extending through aligned apertures in the first end plate of the first tire section and the first end plate of the second tire section.

16. A non-pneumatic tire comprising:
at least first and second tire sections that are operable to be coupled together, wherein each of the tire sections comprises an inner wall, an outer wall, and a plurality of radial supports that extend from the inner wall to the outer wall such that there is no interior volume enclosed by any combination of the inner wall, the outer wall, and the plurality of radial supports, wherein the outer wall is wider than the inner wall.

17. A non-pneumatic tire comprising:
at least first and second tire sections that are operable to be coupled together, wherein each of the tire sections comprises an inner wall, an outer wall, an inner arcuate support coupled to the inner wall, an outer arcuate support coupled to the outer wall, a first radial support that is coupled with and extends between the inner arcuate support and the outer arcuate support, and a second radial support that is coupled with and extends between the inner wall and the outer wall, wherein the first radial support is generally perpendicular to the second radial support, and wherein there is no interior volume enclosed by any combination of the inner wall, the outer wall, the inner arcuate support, the outer arcuate support, the first radial support, and the second radial support.

18. The non-pneumatic tire of claim 17, wherein each of the tire sections further comprises a third radial support that is coupled with and extends between the inner wall and the outer wall, wherein the third radial support is generally parallel with the second radial support, and wherein the second and third radial supports are positioned on opposite sides of the first radial support.

19. The non-pneumatic tire of claim 18, wherein the outer arcuate support comprises a first outer arcuate support, wherein each of the tire sections further comprises a second outer arcuate support that is spaced axially from the first outer arcuate support and a third outer arcuate support that is spaced axially from the first outer arcuate support on the opposite side as the second outer arcuate support.

* * * * *

UNITED STATES PATENT AND TRADEMARK OFFICE
CERTIFICATE OF CORRECTION

PATENT NO.        : 10,279,627 B2
APPLICATION NO.   : 15/050621
DATED             : May 7, 2019
INVENTOR(S)       : James Marklee Raulerson, Jr. et al.

Page 1 of 1

It is certified that error appears in the above-identified patent and that said Letters Patent is hereby corrected as shown below:

In the Claims

Column 9,
Claim 15, Line 33, delete "claim 9" and insert -- claim 14 -- therefor.

Signed and Sealed this
Sixteenth Day of July, 2019

Andrei Iancu
*Director of the United States Patent and Trademark Office*